(12) United States Patent
Wu (10) Patent No.: US 9,587,633 B2
(45) Date of Patent: Mar. 7, 2017

(54) PORTABLE PUMP CAPABLE OF TRANSMITTING AIR PRESSURE VALUE VIA WIRELESS TRANSMISSION TO MOBILE ELECTRONIC DEVICE FOR INDICATION

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 504 days.

(21) Appl. No.: 14/093,577

(22) Filed: Dec. 2, 2013

(65) Prior Publication Data

US 2015/0110645 A1 Apr. 23, 2015

(30) Foreign Application Priority Data

Oct. 18, 2013 (TW) .............................. 102137829 A (51) Int. Cl.
| | |
|---|---|
| *F04B 33/00* | (2006.01) |
| *G01L 17/00* | (2006.01) |
| *F04B 53/12* | (2006.01) |
| *B60C 23/00* | (2006.01) |
| *B60C 23/02* | (2006.01) |

(52) U.S. Cl.
CPC ............ *F04B 33/005* (2013.01); *F04B 33/00* (2013.01); *F04B 53/123* (2013.01); *F04B 53/128* (2013.01); *G01L 17/00* (2013.01); *B60C 23/00* (2013.01); *B60C 23/02* (2013.01)

(58) Field of Classification Search
CPC ........ F04B 33/005; F04B 33/00; F04B 33/02; F04B 53/123; F04B 53/10; F04B 53/121; F04B 53/128; B60C 23/002; G01L 17/00
USPC ........................................ 417/528, 544, 553
See application file for complete search history.

(56) References Cited

U.S. PATENT DOCUMENTS

| | | | | |
|---|---|---|---|---|
| 6,120,265 | A | * | 9/2000 | Wu ........................ F04B 33/005 |
| | | | | 417/526 |
| 6,676,390 | B2 | * | 1/2004 | Wang ...................... F04B 33/00 |
| | | | | 417/468 |
| 6,993,962 | B1 | | 2/2006 | Ko |

(Continued)

FOREIGN PATENT DOCUMENTS

| | | |
|---|---|---|
| CN | 200975322 Y | 11/2007 |
| CN | 101900097 A | 12/2010 |

(Continued)

OTHER PUBLICATIONS

BTPS! Bike Tire Pressure System—because pressure matters, Kickstarter campaign launched Dec. 20, 2012, (https://www.kickstarter.com/projects/670926116/btps-bike-tire-pressure-system-because-pressure-ma?ref=category).*

*Primary Examiner* — Dominick L Plakkoottam
(74) *Attorney, Agent, or Firm* — Alan D. Kamrath; Kamrath IP Lawfirm, P.A.

(57) ABSTRACT

A portable pump includes a cylinder, a nozzle, a valve, a piston rod, a tube, and a pressure sensing device. The nozzle connects with the cylinder and includes a passage connectable with the inflatable. The valve is mounted between the cylinder and the nozzle. The piston rod has a rod hole and is connected with a piston and a handle. The handle includes a recess. The tube is connected with the valve. The pressure sensing device is disposed in the recess. The pressure sensing device can measure a pressure value of the air flowing into the recess and is connectable with a mobile electronic device via wireless transmission for indication.

6 Claims, 9 Drawing Sheets

(56) References Cited

U.S. PATENT DOCUMENTS

| | | | |
|---|---|---|---|
| 7,775,097 B1 * | 8/2010 | Huang | B60C 23/0408 73/146.3 |
| 2008/0308158 A1 * | 12/2008 | Wu | F04B 33/005 137/231 |
| 2010/0054962 A1 | 3/2010 | Wu | |
| 2010/0104453 A1 * | 4/2010 | Wu | F04B 33/005 417/63 |
| 2011/0012722 A1 * | 1/2011 | Petrucelli | B60C 23/0401 340/442 |
| 2011/0290339 A1 * | 12/2011 | Wu | F04B 33/005 137/231 |
| 2013/0101453 A1 | 4/2013 | Chuang | |
| 2014/0111334 A1 * | 4/2014 | Carpenter | G08B 13/14 340/539.26 |
| 2014/0303790 A1 * | 10/2014 | Huang | G06F 19/3475 700/281 |

FOREIGN PATENT DOCUMENTS

| | | |
|---|---|---|
| CN | 103063342 A | 4/2013 |
| TW | 263020 | 11/1995 |
| TW | M410797 U | 9/2011 |
| TW | M478738 U | 5/2014 |

\* cited by examiner

PORTABLE PUMP CAPABLE OF TRANSMITTING AIR PRESSURE VALUE VIA WIRELESS TRANSMISSION TO MOBILE ELECTRONIC DEVICE FOR INDICATION

BACKGROUND OF THE INVENTION

1. Field of the Invention

The present invention relates to a portable pump and, in particular, to a portable pump that can measure the air pressure value of an inflatable and then transmit the value measured thereby via wireless transmission to a mobile electronic device for indicating the air pressure value of the inflatable immediately.

2. Description of the Related Art

Formerly, bicycles are employed for transportation, bicycle commuting, and utility cycling. As time advances, the use of bicycles gradually changes from vehicles to fitness equipment. Bicycles can be categorized in different ways: such as by function, by number of riders, by general construction, by gearing or by the manner of propulsion. The more common types include utility bicycles, mountain bicycles, racing bicycles, touring bicycles, hybrid bicycles, cruiser bicycles, and BMX bikes. The price range for bicycles goes from as low as hundreds of dollars to as much as tens of thousands of dollars. Moreover, air pumps designed for inflating bicycle tires have huge changes. The inflation pressure of bicycle tires ranges from below 30 PSI (2 BAR; 207 KPA) for tubeless mountain bike tires to 220 PSI (15 BAR; 1,517 KPA) for tubular track racing tires, so air pumps for inflating bicycle tires must have a pressure gauge for indicating the pressure values. Several basic types of air pumps for bikes are available, such as floor pumps and portable pumps. However, the shape of the portable pump is abrupt and inharmonious in order to receive a conventional mechanical pressure gauge. Thus, the scale and unit on the gauge will be very small, making it hard to indicate the air pressure value accurately. On the other hand, during pump operation, spokes of the bicycle tire will interfere with the pressure gauge to cause users hardships to indicate the air pressure value.

The present invention is, therefore, intended to obviate or at least alleviate the problems encountered in the prior art.

SUMMARY OF THE INVENTION

In view of the foregoing disadvantages inherent in the known types of portable air pumps now present in the prior art, the present invention provides a portable pump including a cylinder, a nozzle, a valve, a piston rod, a tube, and a pressure sensing device. The cylinder includes a chamber. The nozzle is disposed on one end of the cylinder. The nozzle includes a passage able to connect and be in communication with an inflatable. The valve is mounted between the cylinder and the nozzle. The piston rod includes a rod hole axially extending therethrough. One end of the piston rod is connected with a piston, and the other end of the piston rod is connected with a handle, which is exposed outside of the cylinder head and is adapted for gripping by a user, so that the piston is reciprocal inside the chamber for pushing air unidirectionally passing through the valve and the passage into the inflatable. The handle includes a recess formed therein and connected and in communication with the rod hole. The tube is connected and in communication with the valve and arranged through the piston rod and the piston. Two opposite ends of the tube are respectively connected and in communication with the valve and the rod hole. The pressure sensing device is disposed in the recess of the handle and arranged in an isobaric area formed between the valve and the inflatable. The pressure sensing device includes a wireless transmission circuit board, a sensing unit, and a power supply unit. The sensing unit and the power supply unit are electrically arranged on the wireless transmission circuit board. The sensing unit can measure the pressure value of the air flowing from the passage into the recess, and the wireless transmission circuit board is connectable with a mobile electronic device via wireless transmission for indicating the air pressure value on a screen of the mobile electronic device.

The present invention resides not in any one of these features per se, but rather in the particular combination of all of them herein disclosed and claimed. The present invention is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

An advantage of the portable pump according to the present invention is that the portable pump does not include a hypostatic pressure gauge, to obtain a simple shape and a smaller volume to facilitate collection. Moreover, the portable pump is connectable with a mobile electronic device via wireless transmission for indicating the air pressure value, so that the indication of the air pressure value can zoom in or out on a screen of the mobile electronic device.

Other advantages and features of the present invention will become apparent from the following description referring to the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "inner", "outer", "side", "end", "portion", "section", "longitudinal", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

FIGS. 1 through 8 show a portage pump 1 in accordance with a first embodiment of the present invention including a cylinder 10, a nozzle 20, a valve 30, a piston rod 40, a tube 50, and a pressure sensing device 60. The cylinder 10 includes a chamber 11. The chamber 11 axially extends through two opposite ends of the cylinder 10. A cylinder head 13 is mounted on a distal end of the cylinder 10. The nozzle 20 is disposed on one end of the cylinder 10 opposite to the cylinder head 13. The nozzle 20 is attachable with an inflatable 2. In this embodiment, the inflatable 2 is a tire. The nozzle 20 includes a passage 21 able to connect and be in communication with the inflatable 2. The valve 30 is mounted between the cylinder 10 and the nozzle 20. In this embodiment, the valve 30 is a one-way valve. The piston rod 40 includes a rod hole 41 axially extending therethrough. One end of the piston rod 40 is connected with a piston 42, and the other end of the piston rod 40 is connected with a handle 43, which is exposed outside of the cylinder head 13 and is adapted for gripping by a user, so that the piston 42 is reciprocal inside the chamber 11 for pushing air unidirectionally passing through the valve 30 and the passage 21 into the inflatable 2. The handle 43 includes a recess 44 formed therein and connected and in communication with the rod hole 41. The tube 50 is connected and in communication with the valve 30 and arranged through the piston rod 40 and the piston 42. Two opposite ends of the tube 50 are respectively connected and in communication with the valve 30 and the rod hole 41. The pressure sensing device 60 is disposed in the recess 44 of the handle 43 and arranged in an isobaric area formed between the valve 30 and the inflatable 2. The pressure sensing device 60 includes a wireless transmission circuit board 61, a sensing unit 62, and a power supply unit 63. The wireless transmission circuit board 61 is a BLUETOOTH® circuit board. The sensing unit 62 and the power supply unit 63 are electrically arranged on the wireless transmission circuit board 61. The sensing unit 62 can measure the pressure value of the air flowing from the passage 21 into the recess 44, and the wireless transmission circuit board 61 is connectable with a mobile electronic device 3 (e.g., smart phone, smart watch, tablet computer) via wireless transmission (e.g., BLUETOOTH® connection, Wi-Fi connection) for indicating the air pressure value on a screen 301 of the mobile electronic device 3.

The cylinder 10 has a first connecting portion 12 formed around an outer periphery of one end thereof. The nozzle 20 includes an assembling hole 22 to receive the valve 30. The nozzle 20 further has a second connecting portion 23 formed around an inner periphery of the assembling hole 22 and engageable with the first connecting portion 12 of the cylinder 10 to cause the nozzle 20 and the cylinder 10 to be connected and in communication with each other. In this embodiment, the first and second connecting portions 12 and 23 are screw threads. In another embodiment, the nozzle 20 and the cylinder 10 also can be made in an integrative structure.

Figure 1:
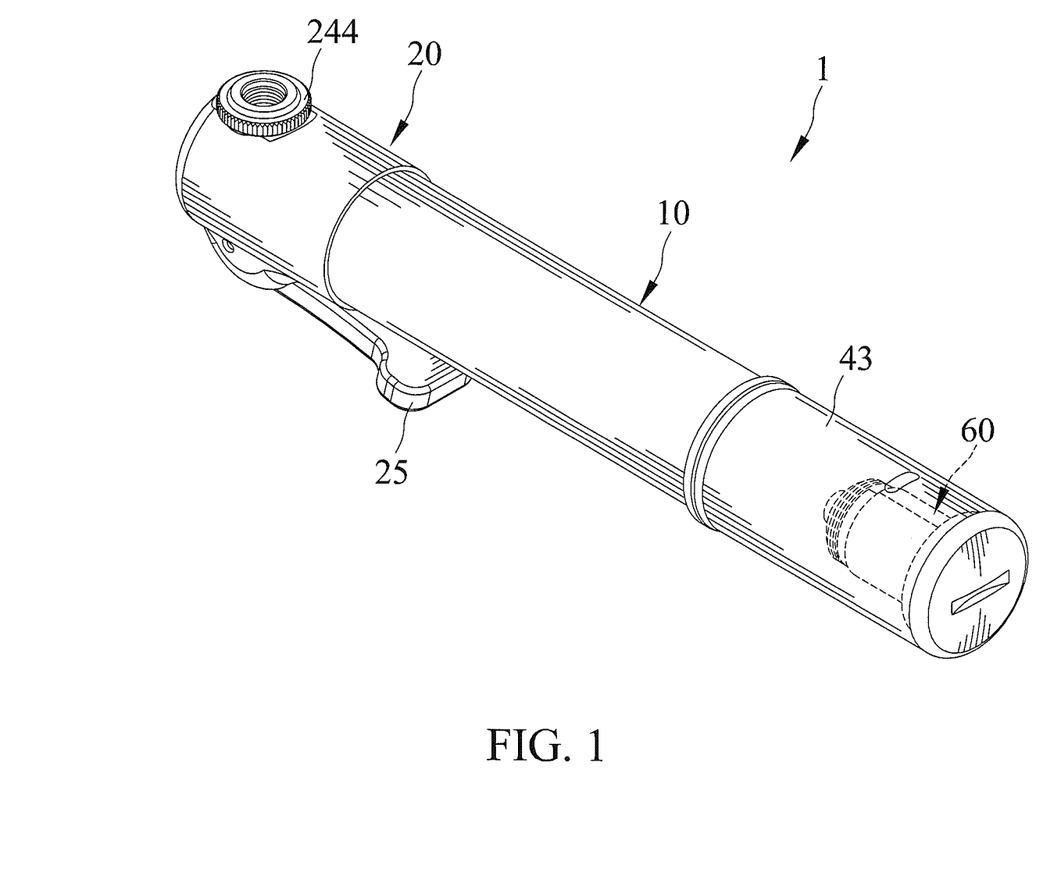
FIG. 1 shows a perspective view of a portable pump in accordance with a first embodiment of the present invention.
Figure 2:
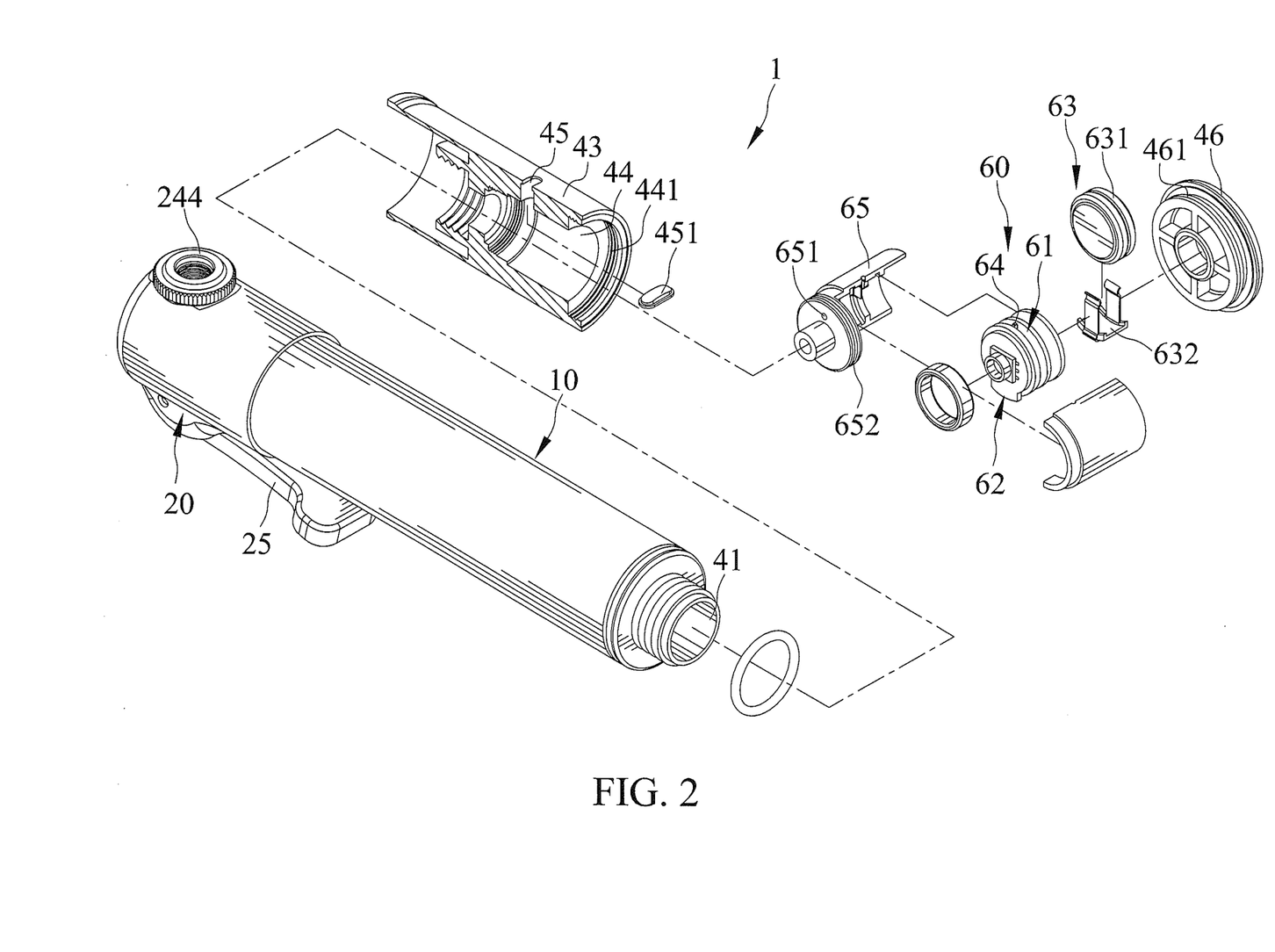
FIG. 2 shows a partial, exploded, perspective view of the portable pump of FIG. 1.
Figure 3:
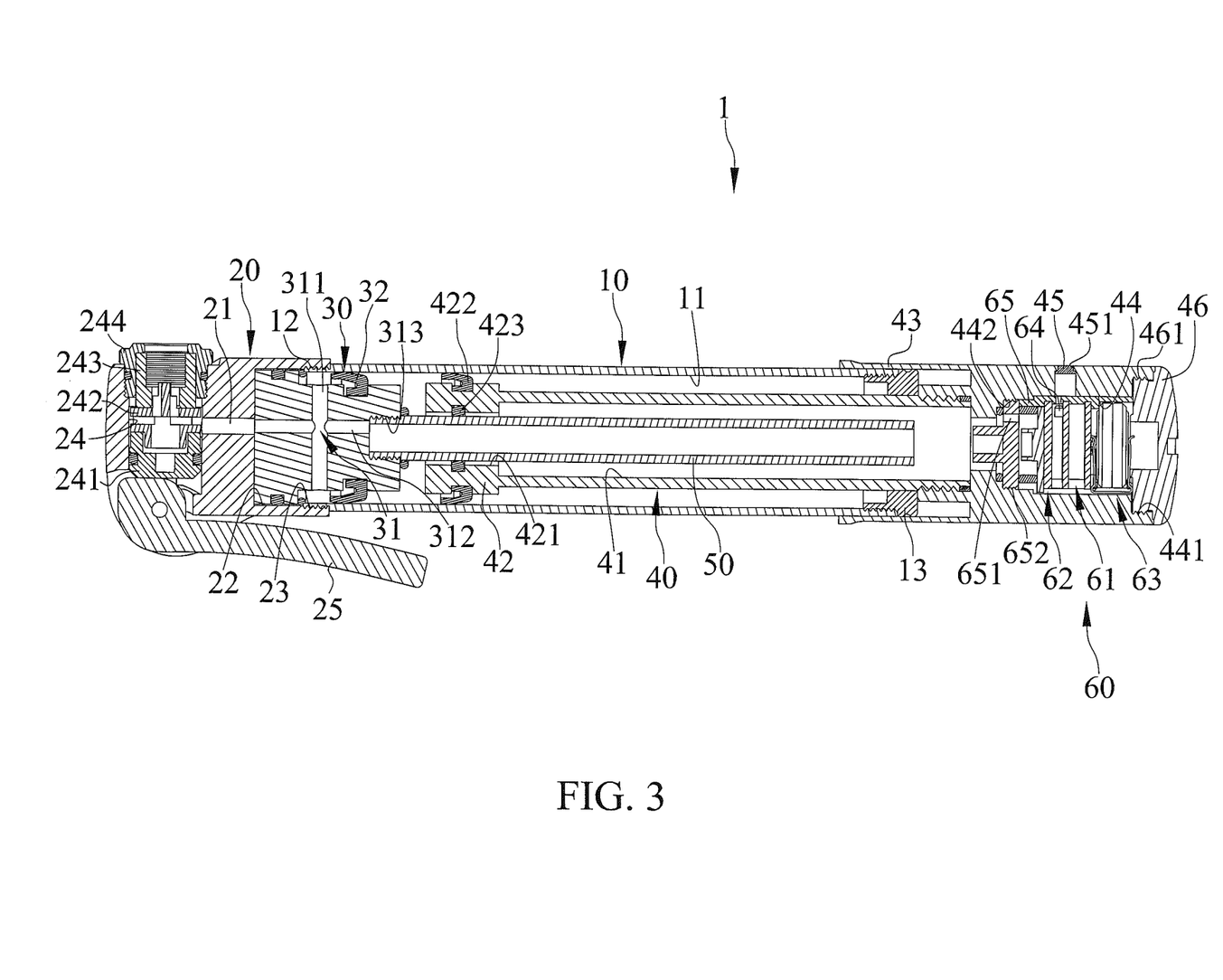
FIG. 3 shows a cross-sectional view of the portable pump of FIG. 1.
Figure 4:
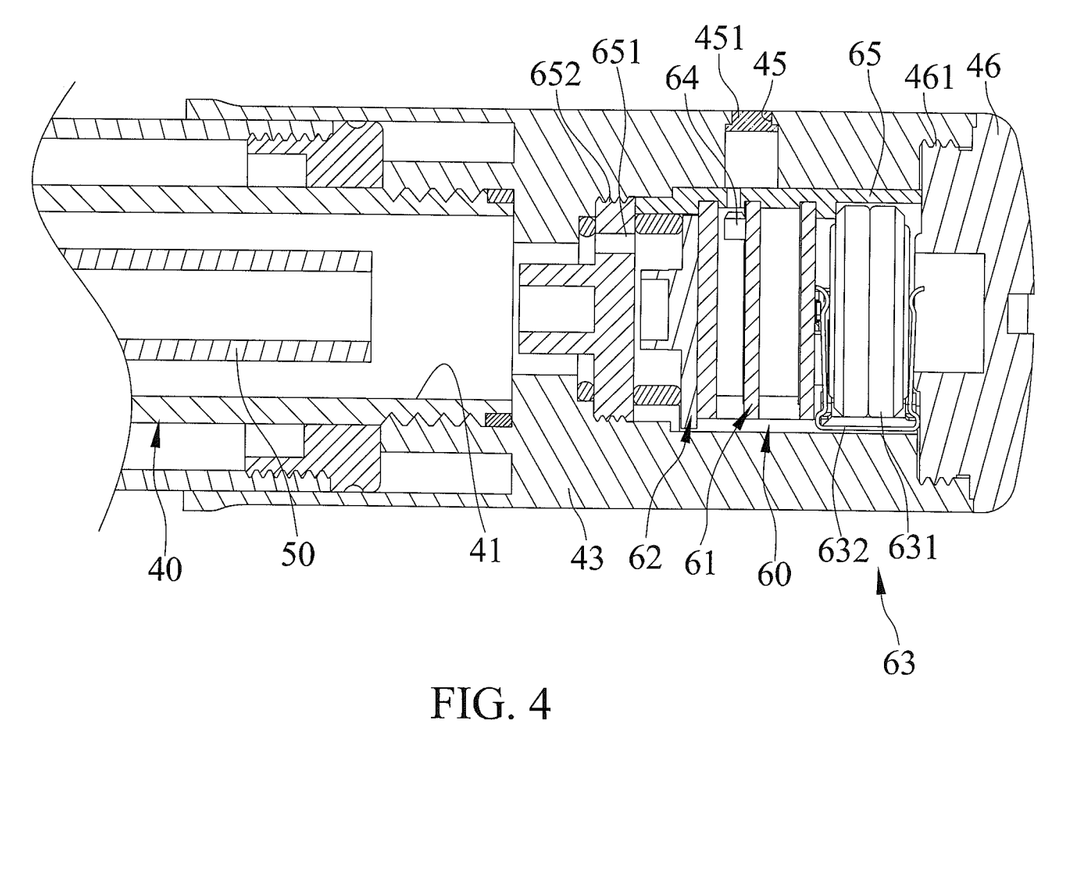
FIG. 4 shows a partial, enlarged view of the portable pump of FIG. 3.

The nozzle 20 includes a bore 24 formed at one end thereof opposite to the cylinder 10. An extending direction of the bore 24 is substantially perpendicular to that of the passage 21, and the bore 24 is in communication with the passage 21. An abutment 241, an adaptor 242, a plug 243 are received in the bore 24, and a cap 244 is threadedly engaged with an opening of the bore 24 to avoid the abutment 241, the adaptor 242, and the plug 243 disengaging from the bore 24. The adaptor 242 is arranged between the abutment 241 and the plug 243 and in communication with the passage 21. The cap 244 and the plug 243 are adapted for engaging with a valve of the inflatable 2 to cause the inflatable 2 to be connected and in communication with the adaptor 242. Moreover, a lever 25 is pivotally arranged at the end of the nozzle 20 and adapted for pushing the abutment 241 to cause the cap 244 and the plug 243 to engage with the valve of the inflatable 2 securely.

The handle 43 includes a through hole 45 interconnecting with the recess 44, and the wireless transmission circuit board 61 includes an indicator light 64 arranged in the corresponding position with the through hole 45. The indicator light 64 switches on as the wireless transmission circuit board 61 wirelessly connects with the mobile electronic device 3. A diffuser 451 covers an opening of the through hole 45 and is made of a transparent material.

The valve 30 includes an orifice 31 and a limiting ring 32. The orifice 31 includes first and second channels 311 and 312 connected and in communication with each other. The first channel 311 unidirectionally is connected with the chamber 11, and two opposite ends of the second channel 312 are respectively connected and in communication with the passage 21 and the tube 50. The limiting ring 32 surrounds the valve 30 and abuts against the chamber 11. The limiting ring 32 is made of a soft material. An outer diameter of the limiting ring 32 gradually increases from an end adjacent to the piston 42 to the other end adjacent to the nozzle 20 to cause the first channel 311 of the orifice 31 to be unidirectionally connected with the chamber 11. The valve 30 includes a first assembling hole 313 connected and in communication with the orifice 31, and the piston 42 includes a second assembling hole 421 axially extending therethrough. An unidirectional air tight ring 422 is disposed around the piston 42 and abuts against the chamber 11. The air tight ring 422 causes the chamber 11 to be divided into two parts that are unidirectionally connected with each other. The tube 50 inserts through the second assembling hole 421 and an O-ring 423 disposed in the second assembling hole 421, and the tube 50 is threadedly fixed into the first assembling hole 313.

The power supply unit 63 includes at least one battery 631. In this embodiment, the power supply unit 63 includes two batteries 631 and a clamp 632 gripping the two batteries 631 and electrically connected with the wireless transmission circuit board 61, and the batteries 631 are lithium batteries.

The recess 44 includes a first joining portion 441 formed around an inner periphery thereof. The handle 43 further includes a cover 46, which has a second joining portion 461 formed around an outer periphery thereof and engageable with the first joining portion 441 of the recess 44 to cause the cover 46 to be disengageable from the handle 43 to replace the battery 631. In this embodiment, the first and second joining portions 441 and 461 are screw threads.

The recess 44 includes a first engaging portion 442 formed at an inner periphery thereof. The pressure sensing device 60 further includes a case 65 arranged in the recess 44 and accommodating the wireless transmission circuit board 61, the sensing unit 62 and the power supply unit 63. The case 65 includes a vent 651, and a second engaging portion 652, with the vent 651 formed at one end face thereof formed and in communication with the rod hole 41, and with the second engaging portion 652 engageable with the first engaging portion 442. In this embodiment, the first and second engaging portions 442 and 652 are screw threads.

Figure 6:
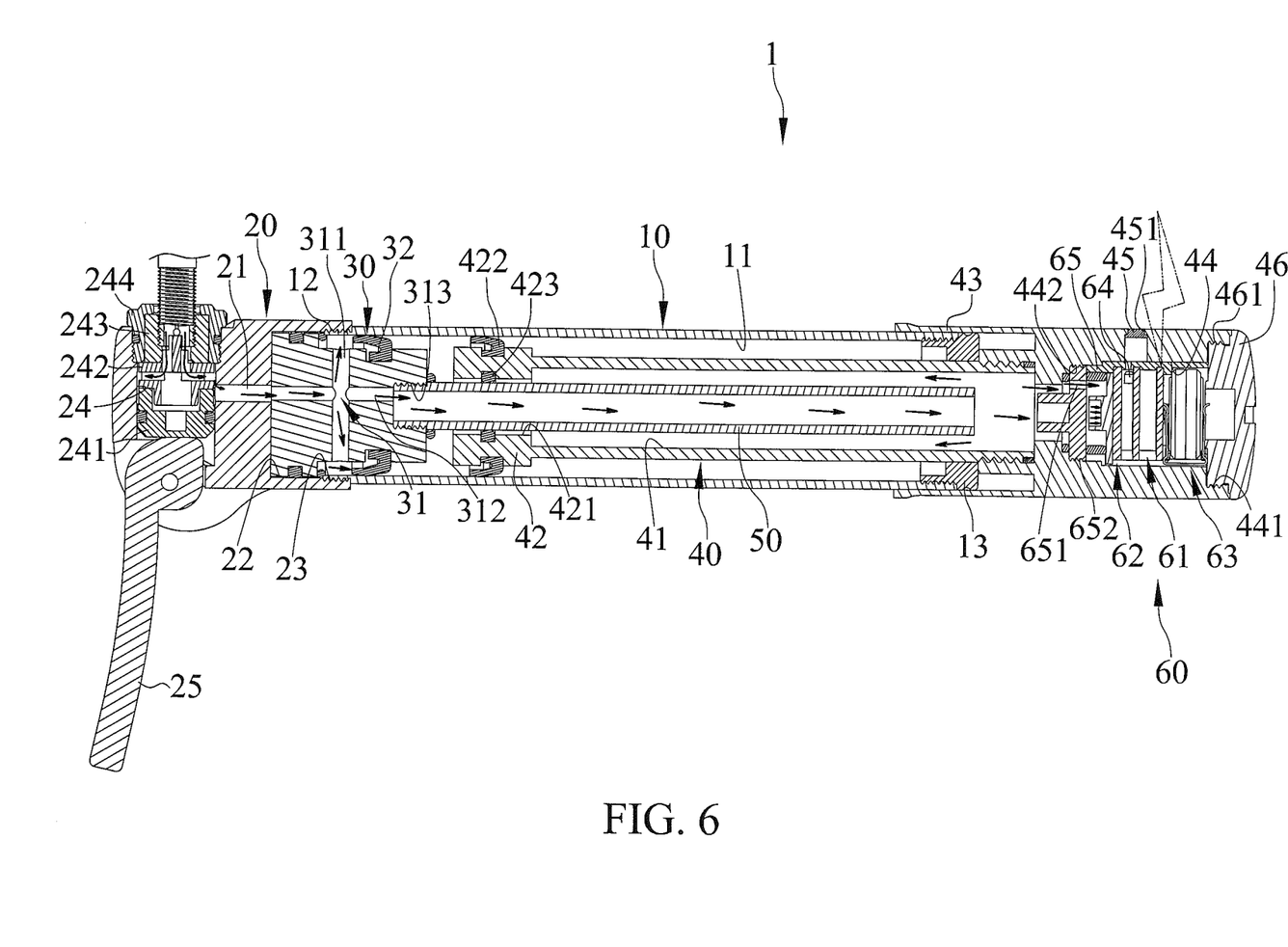
FIG. 6 shows an enlarged, cross-sectional view of the portable pump of FIG. 5 and illustrates air flowing from the tire to the nozzle.

When the cap 244 and the plug 243 attach with the valve of the inflatable 2, the inside of the inflatable 2, the adaptor 242, the passage 21, the second cannel 312 of the orifice 31 of the valve 30, the tube 50, the rod hole 41, the vent 651, and the recess 44 are interconnected to form the isobaric area.

Figure 5:
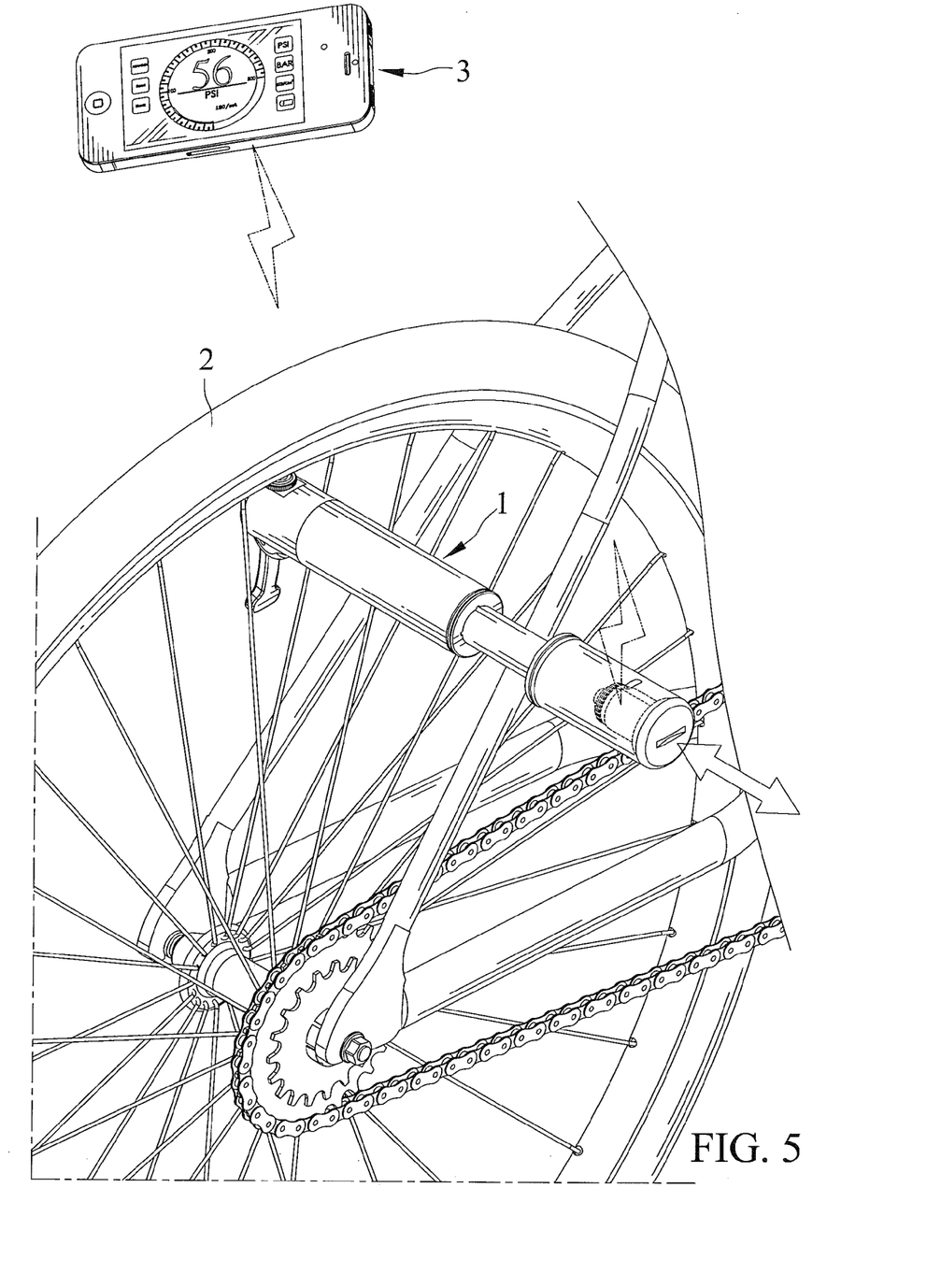
FIG. 5 shows a perspective view of the portable pump of FIG. 1 and illustrates a nozzle of the portable pump attaching with a tire, and a pressure sensing device sending signals to a mobile electronic device.

Therefore, the sensing unit 62 measures the pressure value of the air flowing into the recess 44 and the case 65, and, then, the wireless transmission circuit board 61 connects with the mobile electronic device 3 via wireless transmission for indicating the air pressure value. Meanwhile, the indicator light 64 is actuated.

Figure 7:
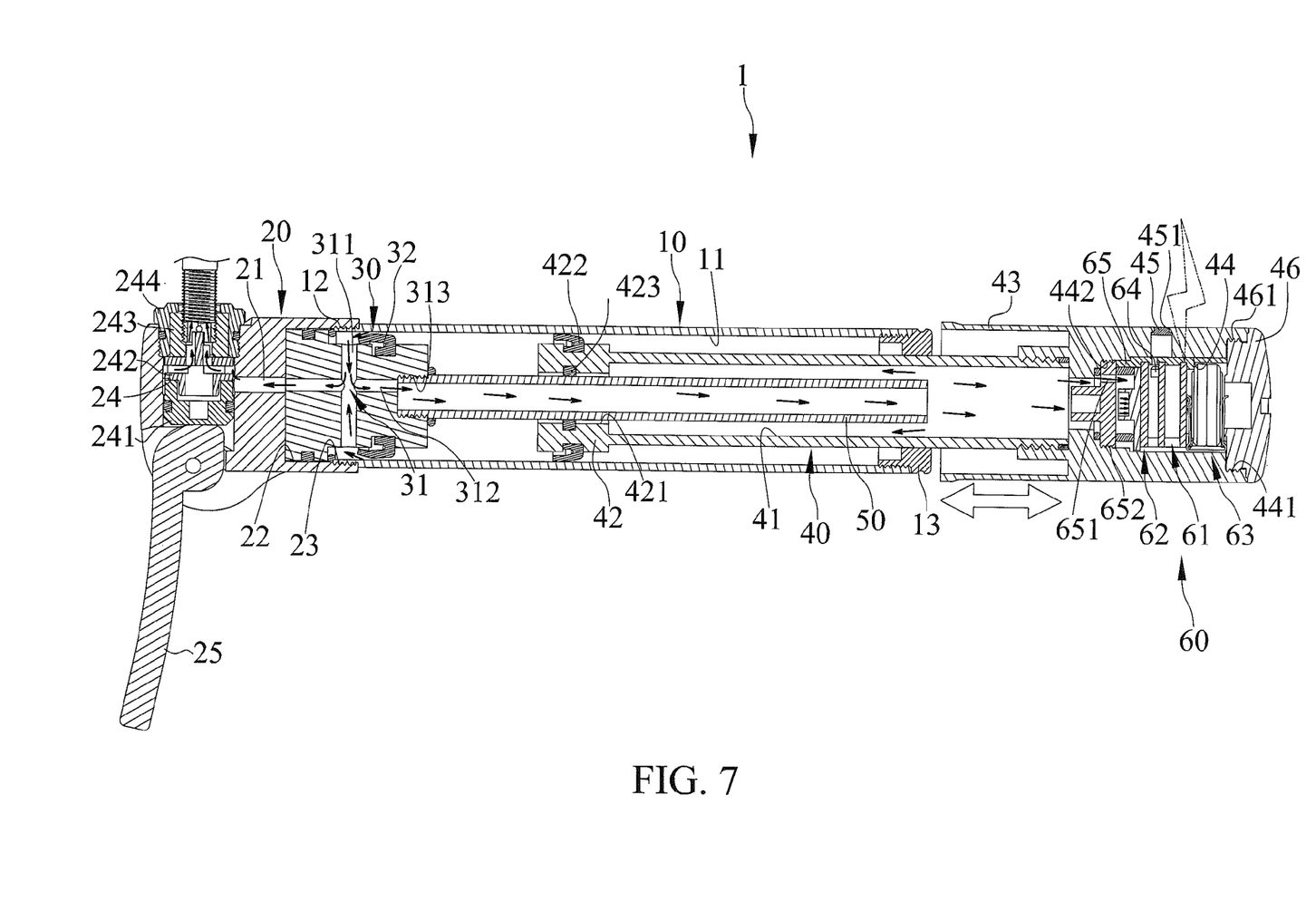
FIG. 7 shows a continued cross-sectional view of the portable pump of FIG. 6 and illustrates a piston reciprocating inside a cylinder for pushing air into the tire.

Moreover, the piston 42 is reciprocal inside the chamber 11 to push the air pressing against the limiting ring 32 to cause the limiting ring 32 to be deformed. Thus, the air passes through the limiting ring 32 and flows into the first and second channels 311 and 312. The air flowing into the first channel 311 passes through the passage 21, the plug 243 and the cap 244 into the inflatable 2.

The air flowing through the second channel 312, the tube 50, the rod hole 41, and the vent 651 into the recess 44 is measured by the sensing unit 62, and the wireless transmission circuit board 61 connects with the mobile electronic device 3 via wireless transmission.

Figure 8:
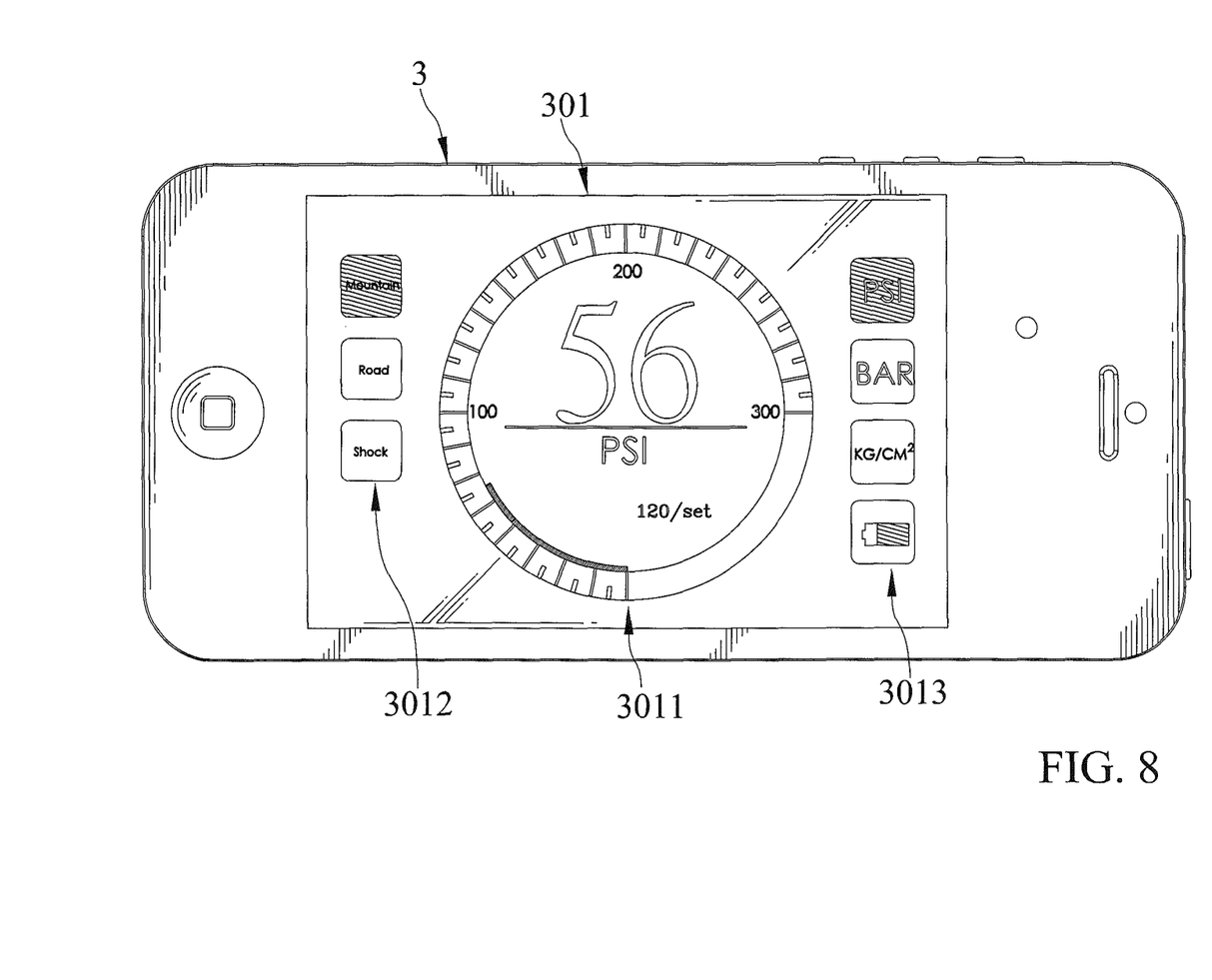
FIG. 8 shows a partial, enlarged view of the portable pump of FIG. 5 and illustrates a screen of the mobile electronic device displaying an image interface for indicating air pressure value of the inflatable.

The mobile electronic device 3 can receive a wireless signal sent from the wireless transmission circuit board 61 and includes a screen 301 adapted for displaying a supported mobile application corresponding with the wireless signal to indicate air pressure value of the inflatable 2 immediately.

An image interface of the mobile application displayed on the screen 301 is divided into a pressure value display section 3011, a pump mode display section 3012, and a pressure unit display section 3013. The pressure value display section 3011 shows the air pressure value transmitted from the wireless transmission circuit board 61, and can simultaneously display both digital and analog displays. The pump mode display section 3012 provides Mountain (short for mountain bike), Road (short for road bike), or Shock (short for shock absorber) modes to choose. The pressure unit display section 3013 provides a variety of units (e.g., PSI, BAR, KG/CM2) to choose and shows the battery level.

Figure 9:
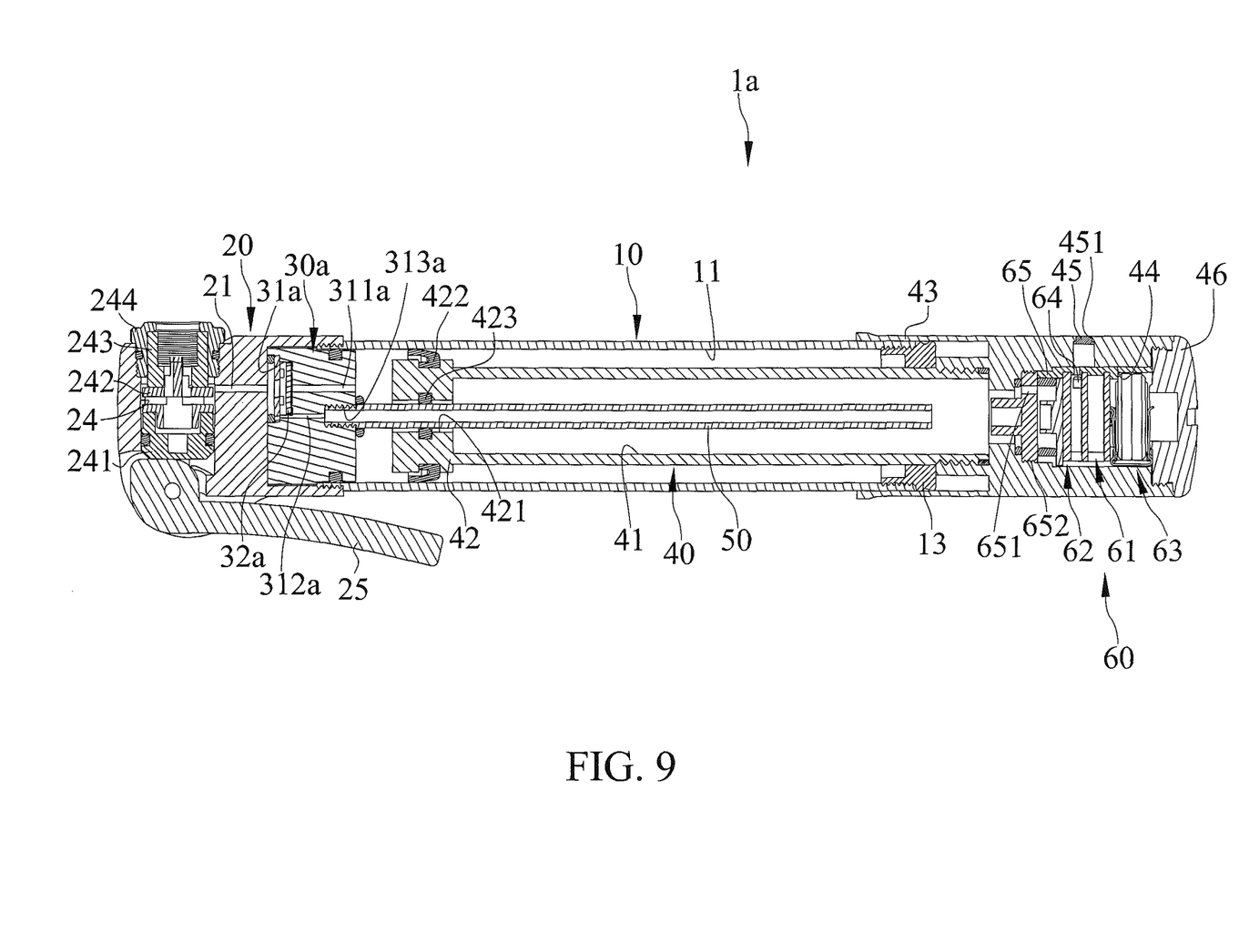
FIG. 9 shows a cross-sectional view of a portable pump in accordance with a second embodiment of the present invention.

FIG. 9 shows a portage pump 1a in accordance with a second embodiment of the present invention. The second embodiment is generally similar to the first embodiment except that the valve 30a includes a first assembling hole 313a an orifice 31a, and a spacer 32a slidably disposed in the orifice 31a. The orifice 31a includes first and second channels 311a and 312a unidirectionally connected and in communication with each other, with the first channel 311a connected with the chamber 11, and with two opposite ends of the second channel 312a respectively connected and in communication with the passage 21 and the tube 50.

In view of the forgoing, it is an object of the present invention to provide portable pumps 1 and 1a which do not include a hypostatic pressure gauge, to obtain a simple shape and a smaller volume to facilitate collection. Moreover, the portable pumps 1 and 1a are connectable with a mobile electronic device 3 via wireless transmission for indicating the air pressure value, so that the indication of the air pressure value can zoom in or out on a screen of the mobile electronic device.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A portable pump comprising:
    a cylinder having a chamber;
    a nozzle disposed on one end of the cylinder and adapted to be attachable with an inflatable, with the nozzle including a passage adapted to be connectable and in communication with the inflatable,
    a valve mounted between the cylinder and the nozzle, wherein the valve includes an orifice and a limiting ring, wherein the orifice includes first and second channels connected and in communication with each other, with the first channel unidirectionally connected with the chamber;
    a piston rod having a rod hole, with one end of the piston rod connected with a piston, and with another end of the piston rod connected with a handle, with the piston slidably disposed and reciprocal inside the chamber for pushing air unidirectionally passing through the valve and the passage into the inflatable, with the handle including a recess;
    a tube connected with the valve and arranged through the piston rod and the piston, with two opposite ends of the tube respectively connected and in communication with the valve and the rod hole, with two opposite ends of the second channel respectively connected and in communication with the passage and the tube, wherein the limiting ring surrounds the valve and abuts against the chamber, wherein the limiting ring is made of a soft material, with an outer diameter of the limiting ring gradually increasing from an end adjacent to the piston to another end adjacent to the nozzle to cause the first channel of the orifice to be unidirectionally connected with the chamber; and a pressure sensing device disposed in the recess, with the pressure sensing device including a wireless transmission circuit board, a sensing unit, and a power supply unit, with the sensing unit and the power supply unit electrically connected with the wireless transmission circuit board, with the sensing unit measuring an air pressure value of the air flowing into the recess, and with the wireless transmission circuit board connectable with a mobile electronic device via wireless transmission for indicating the air pressure value.

2. The portable pump as claimed in claim 1, wherein the wireless transmission circuit board is a BLUETOOTH® circuit board capable of connecting to the mobile electronic device via BLUETOOTH® connection.

3. The portable pump as claimed in claim 1, wherein the valve includes a first assembling hole connected and in communication with the orifice, wherein the piston includes a second assembling hole, and wherein the tube inserts through the second assembling hole and is fixed into the first assembling hole.

4. The portable pump as claimed in claim 1, wherein the handle includes a through hole interconnecting with the recess, wherein the wireless transmission circuit board includes an indicator light arranged in the through hole, wherein the indicator light switches on as the wireless transmission circuit board wirelessly connects with the mobile electronic device, wherein a diffuser covers an opening of the through hole, and wherein the diffuser is made of a transparent material.

5. The portable pump as claimed in claim 1, wherein the power supply unit includes at least one battery, wherein the recess includes a first joining portion formed at an inner periphery thereof, wherein the handle further includes a cover, and wherein the cover includes a second joining portion formed at an outer periphery thereof and engageable with the first joining portion.

6. The portable pump as claimed in claim 1, wherein the recess includes a first engaging portion formed at an inner periphery thereof, wherein the pressure sensing device further includes a case arranged in the recess and accommodating the wireless transmission circuit board, the sensing unit and the power supply unit, wherein the case includes a vent and a second engaging portion, with the vent formed at one end face thereof formed and in communication with the rod hole, and with the second engaging portion engageable with the first engaging portion.

* * * * *